US012177338B2

(12) United States Patent
Van Vredendaal et al.

(10) Patent No.: US 12,177,338 B2
(45) Date of Patent: *Dec. 24, 2024

(54) SYSTEM AND METHOD FOR FLEXIBLE POST-QUANTUM TRUST PROVISIONING AND UPDATING

(71) Applicant: NXP B.V., Eindhoven (NL)

(72) Inventors: Christine Van Vredendaal, Veldhoven (NL); Mario Lamberger, Graz (AT); Markus Hinkelmann, Halstenbek (DE); Hauke Meyn, Krempermoor (DE); Alexander Vogt, Hamburg (DE)

(73) Assignee: NXP B.V., Eindhoven (NL)

( * ) Notice: Subject to any disclaimer, the term of this patent is extended or adjusted under 35 U.S.C. 154(b) by 353 days.

This patent is subject to a terminal disclaimer.

(21) Appl. No.: 17/587,903

(22) Filed: Jan. 28, 2022

(65) Prior Publication Data
US 2023/0246826 A1    Aug. 3, 2023

(51) Int. Cl.
H04L 9/08    (2006.01)
H04L 9/14    (2006.01)
H04L 9/40    (2022.01)

(52) U.S. Cl.
CPC .............. *H04L 9/0852* (2013.01); *H04L 9/08* (2013.01); *H04L 9/14* (2013.01); *H04L 63/00* (2013.01); *H04L 63/0442* (2013.01)

(58) Field of Classification Search
CPC . H04L 9/0852; H04L 9/08; H04L 9/14; H04L 63/00; H04L 63/0442; H04L 63/06
See application file for complete search history.

(56) References Cited

U.S. PATENT DOCUMENTS 6,038,318 A  *  3/2000  Roden ..................... G06F 7/723
                                                              708/277
11,218,301 B1    1/2022  Shea et al.
(Continued)

FOREIGN PATENT DOCUMENTS

DE    102021001919 A1    7/2021
WO       2021087221 A1    4/2010
WO    WO2010045823 A1    4/2010

OTHER PUBLICATIONS

Wikipedia et al., Post Quantum Cryptography, https://en.wikipedia.org/w/index.php?title=Post-quantum_cryptography&oldid=1061715689 (Year: 2021).*

(Continued)

*Primary Examiner* — Robert B Leung
*Assistant Examiner* — Howard H. Louie

(57) ABSTRACT

Various embodiments relate to a system for provisioning a cryptographic device, including: a memory; a processor coupled to the memory, wherein the processor is further configured to: determine the maximum key generation seed size, maximum PQC private key size, maximum PQC public key size, and maximum PQC updater size of a plurality of post quantum cryptography algorithms; provision memory in the cryptographic device to store a key generation seed, PQC private key, PQC public key, and PQC updater based upon the determined maximum key generation seed size, maximum PQC private key size, maximum PQC public key size, and maximum PQC updater size; and provision the cryptographic device with a non-PQC secret key, a non-PQC public key, and non-PQC algorithm code configured to carry out non-PQC cryptographic algorithms.

21 Claims, 2 Drawing Sheets

(56) References Cited

U.S. PATENT DOCUMENTS

| | | |
|---|---|---|
| 11,336,462 B1 | 5/2022 | Maganati et al. |
| 11,727,310 B1 | 8/2023 | Arbajian et al. |
| 2018/0270045 A1* | 9/2018 | Almuhammadi ........ G09C 1/00 |
| 2020/0280436 A1 | 9/2020 | Nix |
| 2021/0089507 A1 | 3/2021 | Prasad |
| 2021/0119789 A1 | 4/2021 | Ghosh et al. |
| 2021/0226777 A1 | 7/2021 | Wilson |
| 2022/0038269 A1 | 2/2022 | Nix |
| 2023/0306142 A1 | 9/2023 | Meinholz et al. |

OTHER PUBLICATIONS

Potter et al. https://medium.com/xtrabytes-tech/a-quantum-resistant-strategy-from-xtrabytes-9e3dfdce9d58 (Year: 2020).*

U.S. Appl. No. 17/587,868; Inventor Mario Lamberger, et al.; "System And Method For Post-Quantum Trust Provisioning And Updating With Contemporary Cryptography;"; Filed Jan. 28, 2022.

Xie, Jiafeng et al.; "Special Session: The Recent Advance in Hardware Implementation of Post-Quantum Cryptography"; 2020 IEEE 38th VLSI Test Symposium (VTS); Apr. 5-8, 2020, San Diego, California; DOI: 10.1109/VTS48691.2020.9107585.

Jan-Pieter D'Anvers, Angshuman Karmakar, Sujoy Sinha Roy, Frederik Vercauteren, Jose Maria Bermudo Mera, Michiel Van Beirendonck, and Andrea Basso, Saber, Tech. report, National Institute of Standards and Technology, 2020, available at https://csrc.nist.gov/projects/post-quantum-cryptography/round-3-submissions.

David Cooper, Daniel Apon, Quynh Dang, Michael Davidson, Morris Dworkin, and Carl Miller, Recommendation for stateful hash-based signature schemes, Oct. 29, 2020, 2020.

National Institute of Standards and Technology, Post-quantum cryptography standardization, Dec. 2016 https://csrc.nist.gov/Projects/Post-Quantum-Cryptography/, Post-Quantum-Cryptography-Standardization.

Peter Schwabe, Roberto Avanzi, Joppe Bos, Léo Ducas, Eike Kiltz, Tancréde Lepoint, Vadim Lyubashevsky, John M. Schanck, Gregor Seiler, and Damien Stehlé, Crystals-Kyber, Tech. report, National Institute of Standards and Technology, 2020, available at https://csrc.nist.gov/projects/post-quantum-cryptography/round-3-submissions.

Non-Final Office Action mailed Jan. 31, 2024 for U.S. Appl. No. 17/587,868; 27 Pages.

Notice of Allowance mailed Apr. 17, 2024; for U.S. Appl. No. 17/587,868; 16 Pages.

Tanizawa, Yoshimichi; "Communication Device, Communication System and Communication Method"; Mar. 1, 2018; JP-2018033079-A; [NPL is from Examiner's Jan. 31, 2024 Form 892 for U.S. Appl. No. 17/587,868].

* cited by examiner

SYSTEM AND METHOD FOR FLEXIBLE POST-QUANTUM TRUST PROVISIONING AND UPDATING

TECHNICAL FIELD

Various exemplary embodiments disclosed herein relate generally to a system and method for flexible post-quantum trust provisioning and updating.

BACKGROUND

In a Trust Provisioning (TP) process, secret keys are installed in the (secure) memory of a device after its production. Generally, one or many (typically) RSA/ECC keypairs are created for public key cryptography. Additionally, symmetric keys can be provisioned for use in the field. Devices provisioned in the field, along with their keying material, may then be used in the field for a very long time (up to 20 years or more).

A threat to this PKI provisioning system are the advances being made in quantum computing. A full-scale quantum computer is believed to be able to recover RSA/ECC secret keys from their public counterparts or even from messages digitally signed with that keypair, and thereby removing the security of the provisioned devices because the user is no longer able to trust the keys and the cryptography protecting critical operations of the device. To secure future devices, efforts are going into post-quantum cryptography (PQC), i.e., public key cryptography that can withstand attacks even by a quantum adversary. Standardization bodies such as the National Institute of Standards and Technology (NIST) are working towards standardizing a set of schemes that are recommended to be used.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a system for provisioning a cryptographic device, including: a memory; a processor coupled to the memory, wherein the processor is further configured to: determine the maximum key generation seed size, maximum PQC private key size, maximum PQC public key size, and maximum PQC updater size of a plurality of post quantum cryptography algorithms; provision memory in the cryptographic device to store a key generation seed, PQC private key, PQC public key, and PQC updater based upon the determined maximum key generation seed size, maximum PQC private key size, maximum PQC public key size, and maximum updater size; and provision the cryptographic device with a non-PQC secret key, a non-PQC public key, and non-PQC algorithm code configured to carry out non-PQC cryptographic algorithms.

Various embodiments are described, wherein the processor is further configured to: transmit a PQC updater to the cryptographic device, wherein the PQC updater is configured to generate the PQC private key and PQC public key based upon the key generation seed and to implement PQC algorithms in the cryptographic device.

Various embodiments are described, wherein the processor is further configured to: receive a PQC-updated message from the cryptographic device that indicates that the cryptographic device has been successfully updated to carry out PQC algorithms.

Various embodiments are described, wherein the processor is further configured to: receive a non-PQC disabled message from the cryptographic device.

Various embodiments are described, wherein provisioning memory in the cryptographic device to store the key generation seed, PQC private key, PQC public key, and updater based upon the maximum key generation seed size, determined maximum PQC private key size, maximum PQC public key size, and maximum PQC updater size includes provisioning memory in the cryptographic device to store a plurality of key generation seeds, PQC private keys, and PQC public keys.

Various embodiments are described, wherein the PQC updater is configured to generate the plurality of PQC private keys and PQC public keys based upon the plurality of key generation seeds.

Various embodiments are described, wherein provisioning memory in the cryptographic device to store the key generation seed, PQC private key, PQC public key, and PQC updater based upon the determined maximum key generation seed size, maximum PQC private key size, maximum PQC public key size, and maximum PQC updater size includes provisioning memory in the cryptographic device to store a plurality of PQC private keys and PQC public keys.

Various embodiments are described, wherein the PQC updater includes a key definition function configured to generate the plurality of PQC private keys and PQC public keys based upon the key generation seed.

Further various embodiments relate to a cryptographic system, including: a memory including a secure portion; a processor coupled to the memory, wherein the processor is further configured to: receive a memory provisioning request from a backend system including a key generation seed size, PQC private key size, PQC public key size, and PQC updater size; provision memory in the secure portion to store a key generation seed, a PQC private key, a PQC public key, and an PQC updater based upon the received key generation seed size, received PQC private key size, received PQC public key size, and received PQC updater size; receive a non-PQC provisioning request from the backend system including a non-PQC private key, non-PQC public key, and non-PQC updater; and provision the cryptographic device using the non-PQC updater with the non-PQC secret key, the non-PQC public key, and the non-PQC algorithm code configured to carry out non-PQC cryptographic algorithms.

Various embodiments are described, wherein the processor is further configured to: receive a PQC updater from the backend system; and execute the PQC updater to generate the PQC private key and PQC public key based upon the key generation seed and to implement PQC algorithms in the cryptographic device.

Various embodiments are described, wherein the processor is further configured to: transmit a PQC-updated message to the backend system that indicates that the cryptographic device has been successfully updated to carry out PQC algorithms.

Various embodiments are described, wherein the processor is further configured to: disable the non-PQC secret key, the non-PQC public key, and the non-PQC algorithm code; and transmit a non-PQC disabled message to the backend system.

Various embodiments are described, wherein disabling the non-PQC secret key, the non-PQC public key, and the non-PQC algorithm code includes deleting the non-PQC secret key, the non-PQC public key, and the non-PQC algorithm code.

Various embodiments are described, wherein provisioning memory in the secure portion to store a key generation seed, a PQC private key, a PQC public key, and an PQC updater based upon the received key generation seed size, received PQC private key size, received PQC public key size, and received PQC updater size includes provisioning memory in the secure portion to store a plurality of key generation seeds, PQC private keys, and PQC public keys.

Various embodiments are described, wherein the processor is further configured to generate the plurality of PQC private keys and PQC public keys based upon the plurality of key generation seeds using PQC updater.

Various embodiments are described, wherein provision memory in the secure portion to store a key generation seed, a PQC private key, a PQC public key, and an PQC updater based upon the received key generation seed size, received PQC private key size, received PQC public key size, and received PQC updater size includes provisioning memory in the secure portion to store a plurality of PQC private keys and PQC public keys.

Various embodiments are described, wherein the processor is further configured to generate the plurality of PQC private keys and PQC public keys based upon the key generation seed using a key definition function in the PQC updater.

Various embodiments are described, wherein the processor is further configured to: generate a first PQC private key and a first PQC public key of the plurality of PQC private keys and PQC public keys based upon the key generation seed using a key definition function in the PQC updater; and receiving the rest of the plurality of PQC private keys and PQC public keys from the backend system using the first PQC private key and the first PQC public key.

Various embodiments are described, wherein the processor is further configured to transmit the PQC public key to other parties.

Various embodiments are described, wherein the processor is further configured to generate a symmetric key using the key generation seed, wherein the generated symmetric key is used with the backend system.

Various embodiments are described, wherein the processor is further configured to transmit the PQC public key to other parties.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
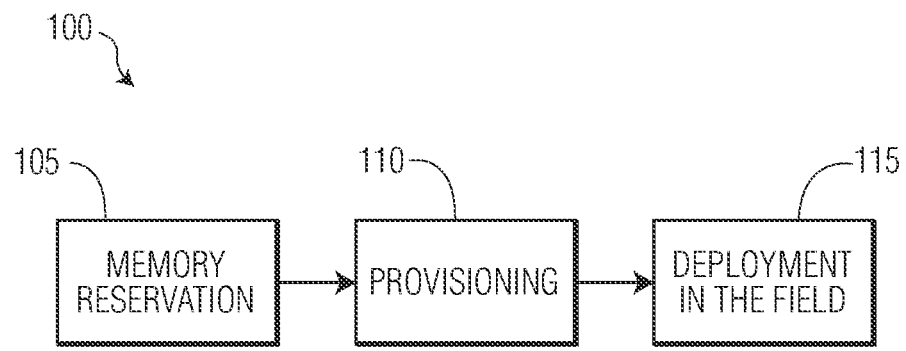
FIG. 1 illustrates the provisioning method a cryptographic device and deployment of the cryptographic device.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Recently, NIST standardized hash-based signatures which are post-quantum resistant, but, due to the need of maintaining a state, are not useful for all use-cases. Key updateability mechanisms exist, but cannot simply update to post-quantum algorithms with the existing updater. Because this updater protects the integrity and authenticity of its updates with pre-quantum keys, an attacker can simply take the known public key, recover the secret key, and breach confidentiality or forge a signature. Even if the assumption is made that this occurs after the first cryptographically relevant quantum computer, but before large-scale availability, an adversary could record the transaction and later read the contents in order to break confidentiality. Additionally, the updaters are designed to update an advanced encryption standard (AES)/elliptic curve cryptography (ECC)/Rivest-Shamir-Adleman (RSA) key to the same type of key. In the case where this content consists of new post-quantum cryptography (PQC) private or public keys, this may result in various problems. In-the-field-updating to PQC keys comes with a list of challenges including: it is unclear to which PQC algorithm the devices will be updated because there is ongoing development and standardization of PQC algorithms; PQC keys are generally much larger than ECC/RSA keys and therefore they cannot simply be placed in the allocated RSA/ECC storage slots; updates are often a broadcast of one signed update to many devices and sending die-specific updates (with e.g. PQC keys) would pose a challenge; the size of PQC read-only memory (ROM) code for the updater mechanism is not negligible, and the new sign/verify components can take 100(s) kB of extra space; and space is scarce on constrained devices. These various technical challenges will be addressed in the embodiments described herein.

Current application devices using cryptography might be in the field for decades. There is a possibility that during this time the usage of a quantum computer by an attacker becomes feasible. In response, PQC keys cannot now be provisioned, because it is unclear which PQC algorithms will be standardized or whether the algorithm details will change before standardization. At the same time, the cryptographic keys and an updater read only memory (ROM) code for PQC is large and on current devices cannot simply replace the ECC/RSA keys due to space constraints.

Embodiments of a post-quantum update method are described herein that may utilize pre-provisioned seeded material to produce PQC keys. This is done in a flexible way that may be adapted to the specific PQC algorithm that is developed and used in the application device. Further, the method described herein securely provisions PQC keys to a device, while being able to manage the risk of the PQC algorithm that is to be used later and that is still unknown during the provisioning process.

First, an embodiment of a method for updating a device to one PQC encryption key pair with two potential algorithm choices will be described. Next, a description will be provided as to how to generalize to multiple PQC key pairs, multiple algorithm options, as well as other possible variations.

As an example, a device with a post-quantum keypair is to be provisioned, where it is uncertain whether it will be a KyberKEM-512 keypair or a LightSaber-r3 keypair. The current key sizes and the key generation seed size for these options are:

| Algorithm | Secret Key (sk) size (bytes) | Public Key (pk) size (bytes) | Key Generation Seed size (bytes) |
|---|---|---|---|
| KyberKEM-512 | 800 | 832 | 32 |
| LightSaber-r3 | 672 | 896 | 32 |

For RSA the key size is typically in the range of 128 to 512 bytes. For ECC the key size is typically in the range of 32 to 128 bytes. As seen in the table above, the storage required by the PQC examples are much greater.

FIG. 1 illustrates the provisioning method 100 a cryptographic device and deployment of the cryptographic device. A device manufacturer or implementor first reserves 105 memory for the storage of the PQC secret key (PQC_SK_KEY), public key (PQC_PK_KEY), key generation seed (PQC_KEY_SEED), and the updater ROM space (PQC_OVERFLOW_SPACE). The space required for each of these items may be, for example, as follows:

PQC_KEY_SEED—32 bytes;
PQC_SK_KEY—800 bytes;
PQC_PK_KEY—896 bytes; and
PQC_OVERFLOW_SPACE—100 kB.

It is noted that in this example, sufficient space is provisioned for either the KyberKEM-512 PQC algorithm or the LghtSaber-r3 PQC algorithm. In this example, PQC_SK_KEY is set to 800 bytes to accommodate the larger secret key used by the KyberKEM-512 PQC algorithm. Further, PQC_PK_KEY is set to 896 bytes to accommodate the larger public key used by the LghtSaber-r3 PQC algorithm. When the space if provisioned for the public key, secret key, the key generation seed, and the updated ROM space, the maximum values for each of these parameters among the potential PQC algorithms is determined and then chosen as the value used to size the memory required for the various parameters. As a result, there is sufficient space available for a variety of different PQC algorithms to be provisioned in the future.

Next, the manufacturer or implementer provisions the cryptographic device 110. During provisioning the PQC_KEY_SEED is provisioned to the device, but the other memory slots PQC_SK_KEY, PQC_PK_KEY, and PQC_OV ERFLOW_SPACE remain empty. All of these memory slots are protected to prevent unauthorized access.

Currently, a non-PQC public key may be stored off-chip in plain. However, in the PQC setting, when a public key that is stored in plain or encrypted with a non-PQC secure algorithm, a quantum attacker could recover the public key and subsequently calculate the private key. Note that public keys encrypted using symmetric schemes with <256 (e.g., PRINCE) may not be secure either. A classic non-PQC asymmetric algorithm (e.g. RSA) may be secure also in the PQC setting when the public key is protected close to the protection level of the secret key. When it is stored off-chip, it should be protected with, for example, AES-256 or similar encryption.

The provisioning step 110 will also include provisioning of a current cryptographic algorithm, for example, RSA or ECC. This provisioning will including the storing the code to carry out the cryptographic algorithm and producing and storing the associated secret and public cryptographic keys.

Once the cryptographic device is provisioned, it may be deployed in the field 115.

The cryptographic device may include a hardware security module (HSM). The HSM may be a secure physical computing device that safeguards and manages cryptographic keys, performs encryption and decryption functions in support of secure communications, digital signatures, and strong authentication. The HSM may include specialized hardware processors optimized to efficiently carry out various cryptographic algorithms. Further, the HSM may include secure memory that protects cryptographic keys and other sensitive information and prevents tampering and unauthorized access of the secret material. The functions of the HSM may include: onboard secure cryptographic key generation; onboard secure cryptographic key storage, at least for the top level and most sensitive keys, which are often called master keys; key management; use of cryptographic and sensitive data material, for example, performing encryption or digital signature functions; and offloading application servers for complete asymmetric and symmetric cryptography.

Figure 2:
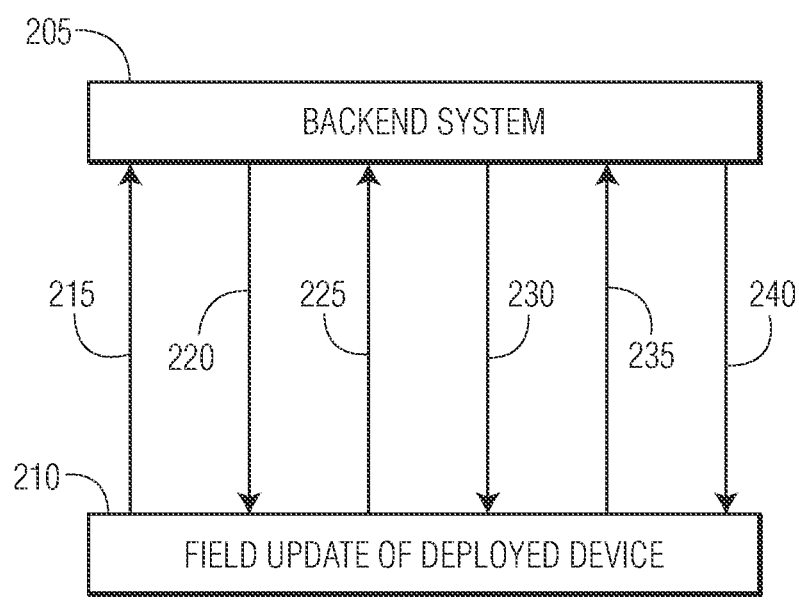
FIG. 2 illustrates the steps carried out between a deployed device in the field and a backend system.

FIG. 2 illustrates the steps carried out between a deployed device 210 in the field and a backend system 205. When the need to switch to a PQC updater arises (e.g., when the first large scale quantum computer would be available to an attacker), the deployed device 210 indicates 215 that is ready for a PQC update. In response, the backend system 205 then sends 220 a PQC updater to the deployed device 210. The PQC updater PQC_Keygen includes code for updating to a specific PQC algorithm, e.g., either KyberKEM-512 or LightSaber-r3. The PQC_OVERFLOW_SPACE defined above may be used to store this updater code. The HSM in the deployed device 210 may then apply PQC_Keygen to pre-provisioned PQC_KEY_SEED to produce the secret key PQC_SK_KEY and store PQC_SK_KEY in the pre-provisioned memory described above. Likewise, PQC_Keygen also produces the public key PQC_PK_KEY and stores PQC_PK_KEY in the pre-provisioned memory describe above. Note that due to the memory reservation step 105, these generated PQC keys will always fit in allocated memory. In one embodiment, the deployed device 210 may clear the PQC_Keygen code after the needed PQC keys are generated. In another embodiment, the deployed device 210 may send the PQC_PK_KEY to any required parties. The device now has a PQC keypair of choice that may be used to carry out PQC operations.

Note that in the absence of a PQC updater, the new PQC_Keygen is sent in a form that a quantum adversary could read. However if the update to the PQC algorithm is made before the availability of a quantum computer, the adversary cannot carry out a man-in-the-middle attack, but instead can only record transmission of the PQC_Keygen code that can be later read using the quantum computer to break the security of the PQC_Keygen transmission. Because the update does not include private key information, this does not breach security.

The PQC_PK_KEY may be sent to the backend system (or the original equipment manufacturer (OEM)) in the same pre-quantum manner, again noting that it is assumed an attacker cannot carry out a man-in-the-middle attack and can break the confidentiality of the message only at a later time, but cannot break its integrity. Alternatively, a symmetric key provisioning is applied to the PQC_KEY_SEED provisioning, and the backend system 205 will itself also have a copy of PQC_KEY_SEED. This allows the backend system 205 to at least detect at least one man-in-the-middle attack (but still not prevent a powerful attacker that can change both messages).

The PQC_Keygen code may also include the code needed to implement the newly provisioned PQC algorithms. This code may be stored in the allocated PQC_OVERFLOW_SPACE to be called upon to carry out PQC operations using the newly generated PQC cryptographic keys.

Also note that this system is more secure when signing with e.g., RSA-PSS (RSA probabilistic signature scheme) or EdDSA (Edwards Digital Signature Algorithm) then when using the Elliptic Curve Digital Signature Algorithm (ECDSA) or Digital Signature Algorithm (DSA). With DSA or ECDSA, a (quantum-enabled) attacker can derive the public and secret key from a message-signature pair. Also note that the PQC_Keygen code could be applied every time the key is necessary. This would negate the need to reserve persistent memory for PQC_SK_KEY, but increase the time for a key exchange, as well as negate the option to clear the PQC_Keygen code. This might be an option in a narrow set of use cases, where a device already in the field has limited key space left, but could store the extra code in ROM.

The deployed device 210 sends an PQC-updated message 225 to the backend system 205 indicating that it has successfully created the PQC keys and installed the PQC code needed to carry out PQC algorithms, and hence is ready to switch to PQC operation. The backend system 205 sends a PQC-updated acknowledgement message 225 that indicates the receipt of the PQC-updated message 225 using PQC encryption to encrypt the PQC-updated acknowledgement message 225. At this point the deployed device 210 may now perform various PQC cryptographic functions as needed.

The deployed device 210 may optionally disable usage of the existing non-PQC cryptographic algorithms, e.g., ECC or RSA. This disabling may include deleting the non-PQC keys and removing the non-PQC code from the deployed device. These steps may further reduce the risk that the non-PQC secret information is compromised. The deployed device 210 sends a non-PQC disabled message 235 to the backend system 205 indicating that the non-PQC cryptographic algorithms have been disabled. At step 240, the backend system 205 sends an non-PQC acknowledgement message 240 to the deployed device 210 indicating that it acknowledges the receipt of the non-PQC disabled message 235.

The embodiments described in FIGS. 1 and 2 may be further modified and generalized as follows. When multiple PQC keys will be needed, space may be reserved for all PQC keys that the deployed device 210 requires. In this situation, a PQC_KEY_SEED may be provisioned for each key, or one PQC_KEY_SEED may be provisioned, and an appropriate Key Definition Function (KDF) may be used to generate multiple PQC keys from PQC_KEY_SEED in a way that diversifies PQC_KEY_SEED for each key.

Note that when more algorithms and keys are planned for, more space is needed to be reserved and that the deployed device includes more space that is potentially un-used. This is a trade-off between memory usage and risk that may be tolerated on a per-product basis.

Also note that it is possible to take a bootstrapping approach. This would work by provisioning the seed for a key pair reserved solely for the updating of multiple PQC keys. This approach could be faster on the one hand, because the PQC_Keygen code on device has to be run only once, but on the other hand no longer allows for broadcast updating.

The embodiments described herein focus on upgrading the updater and encryption/authentication mechanisms of a deployed device. Most Memory Control Units (MCUs)/Memory Protection Units (MPUs) use secure boot for updates as well, and then replace the stored boot image. To make that quantum-safe, the boot code itself also needs to be updated, for instance to verify a boot image signed with PQC signature instead of a DSA or ECDSA signature. As a step after the deployed device is PQC enabled, this could be leveraged to verify such a PQC-secured boot image.

Depending on which PQC algorithms are chosen, different requirements will be made on the hardware (HW). For example, if HW acceleration for hashing functionality like SHA-2/3 or SHA-3 is present, the use of this HW acceleration that will greatly speed up PQC_Keygen as well as the new PQC updater in general. Similarly some PQC_Keygen methods will require randomness beyond the initial seed. In some cases an existing Pseudorandom Number Generator (PRNG)/Deterministic Random Bit Generator (DRBG) that is properly instantiated may be used to assist in providing additional randomness in the PQC update process.

Figure 3:
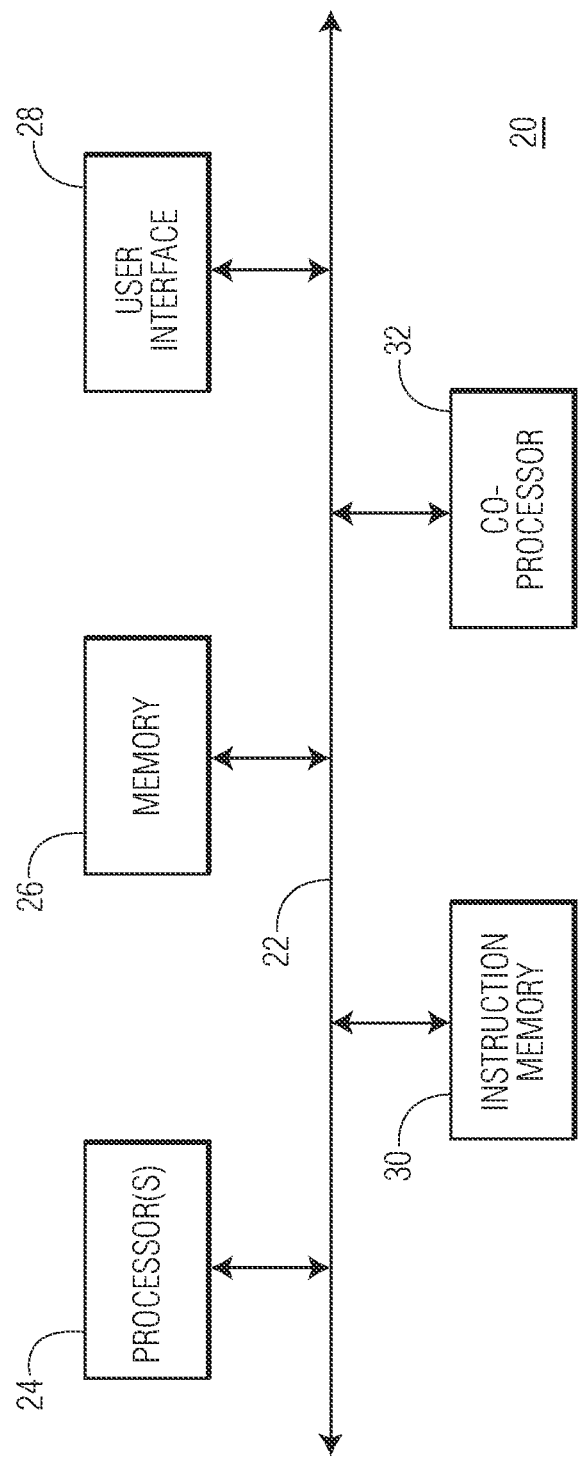
FIG. 3 illustrates, in block diagram form, a data processing system including a co-processor for carrying out the post quantum cryptography update.

FIG. 3 illustrates, in block diagram form, a data processing system 20 including a co-processor 32 for carrying out the PQC update in accordance with the embodiments described herein. The processing system may be implemented in the deployed device 210 or the backend system 205. Data processing system 20 may be a system-on-a-chip (SoC) implemented on a single integrated circuit, or it may be a combination of chips. In other embodiments, integrated circuit 10 may include another type of circuit such as an ASIC (application specific integrated circuit), FPGA (field programmable gate array), or the like, that can provide execute instructions. In one embodiment, data processing system 20 may include metal-oxide semiconductor (MOS) transistors fabricated using a conventional complementary metal-oxide semiconductor (CMOS) process. In another embodiment, data processing system 20 may include other transistor types, such as bipolar, and may be manufactured with a different process.

Data processing system 20 includes communication bus 22, processor(s) 24, memory 26, and cryptography co-processor 32. Bus 22 may be a conventional bus having a plurality of conductors for communicating address, data, and control information. In other embodiments, bus 22 may be an interconnect structure such as for example, a cross-bar switch or other form of interconnect system. Processor(s) 24 is bi-directionally connected to bus 22. Processor(s) 24 may include one or more of any type of processing element, a processor core, microprocessor, microcontroller, field-programmable gate arrays (FPGAs), application-specific integrated circuits (ASICs), digital signal processor, and the like. There can be any number of processors.

Memory 26 is bi-directionally connected to bus 22. Memory 26 can be one or more of any type of volatile or non-volatile memory. Examples of memory types include non-volatile memories such as flash, one-time programmable (OTP), EEPROM (electrically erasable programmable read only memory), and the like. Volatile memory types include static random-access memory (SRAM) and dynamic random-access memory (DRAM). The memory may be used for storing instructions and/or data.

User interface 28 is bi-directionally connected to bus 22 and may be connected to one or more devices for enabling communication with a user such as an administrator. For example, user interface 28 may be enabled for coupling to a display, a mouse, a keyboard, or other input/output device. User interface 28 may also include a network interface having one or more devices for enabling communication with other hardware devices external to data processing system 20.

Instruction memory 30 may include one or more machine-readable storage media for storing instructions for execution by processor(s) 24. In other embodiments, both memories 26 and 30 may store data upon which processor(s) 24 may operate. Memories 26 and 30 may also store, for example, encryption, decryption, and verification applications. Memories 26 and 30 may be implemented in a secure hardware element and may be tamper resistant.

Co-processor 32 is bi-directionally connected to bus 22. Co-processor 20 may be a special type of a co-processor optimized for running encryption/decryption security software according to the RSA, ECC, or Advanced Encryption Standard (AES) or other type of commonly used encryption algorithm. The co-processor 32 may be a HSM that includes secure processing and/or secure memory. Accordingly, and in accordance with the described embodiments, co-processor 32 may be used to efficiently execute instructions for performing the PQC update as discussed above and illustrated in FIGS. 1 and 2. The algorithm executed on co-processor 32 may be used to encrypt/decrypt data and instructions in data processing system 20.

The PQC update method described herein provides a technological solution to allow existing and deployed cryptographic devices to be updated to later use PQC algorithms once they become available. This means that existing deployed devices may still be able to provide secure operation once non-PQC cryptographic algorithms become insecure due to the availability of quantum computers by updated the deployed device to use PQC algorithms.

As used herein, the term "non-transitory machine-readable storage medium" will be understood to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A system for provisioning a cryptographic device, comprising:
   a memory;
   a processor coupled to the memory, wherein the processor is further configured to:
   determine a maximum key generation seed size, a maximum post quantum cryptography PQC private key size, a maximum PQC public key size, and a maximum PQC updater size of a plurality of PQC algorithms;
   provision the memory in the cryptographic device to store a key generation seed, a PQC private key, a PQC public key, and a PQC updater based upon the determined maximum key generation seed size, the maximum PQC private key size, the maximum PQC public key size, and the maximum PQC updater size; and
   provision the cryptographic device with a non-PQC secret key, a non-PQC public key, and a non-PQC algorithm code configured to carry out non-PQC cryptographic algorithms.

2. The system of claim 1, wherein the processor is further configured to:
   transmit the PQC updater to the cryptographic device, wherein the PQC updater is configured to generate the PQC private key and the PQC public key based upon the key generation seed and to implement the plurality of PQC algorithms in the cryptographic device.

3. The system of claim 2, wherein the processor is further configured to:
   receive a PQC-updated message from the cryptographic device that indicates that the cryptographic device has been successfully updated to carry out the plurality of PQC algorithms.

4. The system of claim 3, wherein the processor is further configured to:
   receive a non-PQC disabled message from the cryptographic device.

5. The system of claim 1, wherein the memory in the cryptographic device stores the key generation seed, the PQC private key, the PQC public key, and the PQC updater based upon the determined maximum key generation seed size, the determined maximum PQC private key size, the maximum PQC public key size, and the maximum PQC updater size, and wherein the memory in the cryptographic device stores a plurality of key generation seeds, a plurality of PQC private keys, and a plurality of PQC public keys.

6. The system of claim 5, wherein the PQC updater is configured to generate the plurality of PQC private keys and the plurality of PQC public keys based upon the plurality of key generation seeds.

7. The system of claim 5, wherein the PQC updater includes a key definition function configured to generate the plurality of PQC private keys and the plurality of PQC public keys based upon the key generation seed.

8. The system of claim 1, wherein the memory in the cryptographic device stores the key generation seed, the PQC private key, the PQC public key, and the PQC updater based upon the determined maximum key generation seed size, the maximum PQC private key size, the maximum PQC public key size, and the maximum PQC updater size, and wherein the memory in the cryptographic device stores a plurality of PQC private keys and a plurality of PQC public keys.

9. The system of claim 1, wherein the processor is further configured to transmit the PQC public key to other parties.

10. A cryptographic system, comprising:
a memory including a secure portion;
a processor coupled to the memory, wherein the processor is further configured to:
receive a memory provisioning request from a backend system including a key generation seed size, a PQC private key size, a PQC public key size, and a PQC updater size;
provision the memory in the secure portion to store a key generation seed, a PQC private key, a PQC public key, and a PQC updater based upon the received key generation seed size, the received PQC private key size, the received PQC public key size, and the received PQC updater size;
receive a non-PQC provisioning request from the backend system including a non-PQC secret key, a non-PQC public key, and a non-PQC updater; and
provision the cryptographic system using the non-PQC updater with the non-PQC secret key, the non-PQC public key, and the non-PQC updater configured to carry out a plurality of non-PQC cryptographic algorithms.

11. The system of claim 10, wherein the processor is further configured to:
receive the PQC updater from the backend system; and
execute the PQC updater to generate the PQC private key and the PQC public key based upon the key generation seed and to implement a plurality of PQC algorithms in the cryptographic device.

12. The cryptographic device of claim 11, wherein the processor is further configured to:
transmit a PQC-updated message to the backend system that indicates that the cryptographic device has been successfully updated to carry out the plurality of PQC algorithms.

13. The system of claim 12, wherein the processor is further configured to:
disable the non-PQC secret key, the non-PQC public key, and non-PQC algorithm code; and
transmit a non-PQC disabled message to the backend system.

14. The system of claim 13, wherein disabling the non-PQC secret key, the non-PQC public key, and the non-PQC algorithm code includes deleting the non-PQC secret key, the non-PQC public key, and the non-PQC algorithm code.

15. The system of claim 10, wherein in the secure portion of the memory is provisioned to store the key generation seed, the PQC private key, the PQC public key, and the PQC updater based upon the received key generation seed size, the received PQC private key size, the received PQC public key size, and wherein the received PQC updater size includes provisioning the secure portion to store a plurality of key generation seeds, a plurality of PQC private keys, and a plurality of PQC public keys.

16. The system of claim 15, wherein the processor is further configured to generate the plurality of PQC private keys and the plurality of PQC public keys based upon the plurality of key generation seeds using the PQC updater.

17. The system of claim 16, wherein the processor is further configured to generate the plurality of PQC private keys and the PQC public keys based upon the key generation seed using a key definition function in the PQC updater.

18. The system of claim 16, wherein the processor is further configured to:
generate a first PQC private key and a first PQC public key of the plurality of PQC private keys and the plurality of PQC public keys based upon the key generation seed using a key definition function in the PQC updater; and
receiving a remainder of the plurality of PQC private keys and the plurality of PQC public keys from the backend system using the first PQC private key and the first PQC public key.

19. The system of claim 10, wherein the memory in the secure portion is further provisioned to store a plurality of PQC private keys and a plurality of PQC public keys.

20. The system of claim 10, wherein the processor is further configured to generate a symmetric key using the key generation seed, wherein the generated symmetric key is used with the backend system.

21. The system of claim 10, wherein the processor is further configured to transmit the PQC public key to other parties.

* * * * *